United States Patent [19]
Skaling et al.

[11] 3,898,872
[45] Aug. 12, 1975

[54] TENSIOMETER FOR SOIL MOISTURE MEASUREMENT

[75] Inventors: Percy E. Skaling; Whitney Skaling, both of Santa Barbara, Calif.

[73] Assignee: Soilmoisture Equipment Corporation, Goleta, Calif.

[22] Filed: Oct. 19, 1973

[21] Appl. No.: 408,174

[52] U.S. Cl. ................................................. 73/73
[51] Int. Cl.² .......................................... G01N 19/10
[58] Field of Search ................... 73/73, 74; 141/47

[56] References Cited
UNITED STATES PATENTS
2,878,671  4/1959  Prosser et al. ........................ 73/73
3,043,133  7/1962  Richards .............................. 73/73

*Primary Examiner*—Richard C. Queisser
*Assistant Examiner*—Marcus S. Rasco
*Attorney, Agent, or Firm*—Fulwider, Patton, Rieber, Lee & Utecht

[57] ABSTRACT

A tensiometer for measuring the moisture content of soil, including a water-filled tube and a reservoir and valve assembly for removing entrapped air from the tube and replacing it with water from the reservoir. An exit passage between the reservoir and the tube is normally sealed by a valve closure on a hollow valve stem. As the stem and closure are moved to an open position, water is drawn through the exit passage to replace most of the air in the tube, and is also pumped into the tube through the hollow valve stem, by means of a plunger moving within a pump chamber in the reservoir. The pumped water sweeps air bubbles from the walls of the tube, and, as the valve stem and closure return to a closed position, water and any remaining air bubbles are drawn out through the hollow valve stem, the exit passage being resealed without application of positive pressure to the water in the tube.

10 Claims, 5 Drawing Figures

PATENTED AUG 1 2 1975　　3,898,872

TENSIOMETER FOR SOIL MOISTURE MEASUREMENT

BACKGROUND OF THE INVENTION

This invention relates generally to soil moisture measuring instruments commonly known as tensiometers, and, more particularly, to an improved tensiometer with means for conveniently replenishing it with water and simultaneously removing any accumulated air.

If the moisture content of soil is accurately monitored, irrigation can be controlled accordingly to produce a desired plant growth. Instruments of the tensiometer type have been used for a number of years for this purpose. Basically, a conventional tensiometer comprises a sealed tube defining a chamber completely filled with water, a porous tip on one end of the tube, and a vacuum gauge connected to the water chamber in the tube. The porous tip is buried in the soil and establishes liquid contact between the water in the tube and films of moisture in the soil surrounding the tip.

Relatively dry soil tends to pull water from the tube through the porous tip, but, since the tube is sealed, only a minute amount of water is actually withdrawn, and the water in the tube is "stretched" by the pulling effect of the dry soil, thus creating a measurable subatmospheric pressure in the tube. Higher moisture contents in the soil produce correspondingly less vacuum in the tube.

In a tensiometer of this general type, air tends to accumulate in the tube over a period of time. The air, in dissolved form, may be initially present in the water, and it may also enter by diffusion through the porous tip. The relatively low pressure in the tube allows the air to come out of solution and to gradually accumulate at the top of the tube. When the tube is completely filled with water, as little as 0.05 ml., depending on the type of gauge used, needs to be withdrawn to produce a pressure change of about 80 centibars. However, when air is present in the tube, a much larger volume needs to be withdrawn to produce the same pressure change. Consequently, the presence of air in the tube greatly reduces the sensitivity of the instrument to changes in soil moisture content and can impair accuracy.

In some models of tensiometers, air is removed simply by removing a seal on the top of the tube, filling the tube with water, and replacing the seal again. Apart from its inconvenience, this method has unfortunate side effects. During the time that the seal is removed, water is drawn through the porous tip into the soil, and a long time may pass before this local accumulation of moisture disperses enough to allow an accurate reading of soil moisture content.

Prior to this invention, some tensiometers have included water reservoirs connected to the tube through a valve, manually operable to allow water to be drawn into the tube. The disadvantages of these prior instruments are similar to those associated with the manual refilling method. The vacuum in the tube has to be broken for a relatively long time; closure of the valve puts a positive pressure on the water in the tube; and not all of the air is always removed, especially from tubes of smaller diameter, some usually remaining in the form of small bubbles on the tube walls or near the top of the tube.

It will be appreciated from the foregoing that there exists a need for a tensiometer which can be conveniently replenished with water and from which entrapped air can be effectively removed, so that the tensiometer vacuum seal is broken for only a minimal time and resealing is accomplished without subjecting the instrument to positive pressure. The tensiometer of the present invention fulfills this need.

SUMMARY OF THE INVENTION

The present invention resides in a soil moisture indicating tensiometer having the usual porous tipped tube, but to which water can be conveniently added from a reservoir, and from which accumulated air can be removed almost completely, using a valve which breaks the vacuum seal of the instrument for only a minimal time, and reseals it without application of positive pressure.

Briefly, and in general terms, the tensiometer of the present invention includes a water reservoir attached to the top of the tube and communicating with it through an exit passage, and valve means for sealing the exit passage without application of positive pressure, the valve means being operable to open the exit passage to permit the water supply in the tube to be replenished and to purge practically all gas bubbles from the tube.

More specifically, the valve means in a presently preferred embodiment of the invention includes a valve closure movable between a closed position and an open position, a pump chamber within the reservoir, and a plunger slidably fitted in the pump chamber and movable with the valve closure. An auxiliary passage, opening at one end into the pump chamber, and at the other end into the tensiometer tube, but only when the valve closure is not in the closed position, conveys water from the pump chamber to the tensiometer tube as the valve closure is moved to the open position. Water entering the tube in this manner sweeps air bubbles from the walls of the tube. As the valve closure is moved through a return stroke to the closed position, the auxiliary passage conveys water in the opposite direction, i.e., back into the pump chamber. Any remaining air bubbles are thereby purged from the tube while the valve closure moves to the closed position and reseals the exit on its return stroke, without applying positive pressure to the water in the tube. Air removed in this manner on the return stroke is pumped from the pump chamber on the next operation of the valve means, and is allowed to escape to atmosphere.

Preferably, the valve closure and the plunger are mounted on a common stem, and the valve closure is urged into the closed position by resilient means pulling upwardly on the stem. The auxiliary passage is formed in the stem, with an opening into the pump chamber and a second opening angularly disposed near the lower end of the stem so that water pumped from it will sweep the walls of the tube when the stem is moved downwardly to open the valve closure.

Basically, the valve means operates in three steps to remove air from the tensiometer tube. First, as the valve closure is opened, low pressure air escapes around the closure and water is drawn in to replace it. Then, as the stem is moved downwardly to further open the valve closure, water is pumped into the tube from the pump chamber to sweep air bubbles from the tube walls. Finally, as the stem returns to its normal position, water, and with it, any remaining air bubbles, are sucked out into the pump chamber, the air being pumped from the chamber on subsequent operation of the valve means. The valve closure and plunger may be operated manually or by means of a remotely energized solenoid.

A reservoir cover is included, in the preferred embodiment of the invention, to seal the reservoir and thereby to reduce contamination and evaporation of the water contained in it. The upper end of the stem protrudes through the cover and is specially shaped to provide automatic venting of the reservoir as the valve means is operated by movement of the stem.

From the foregoing, it can be readily appreciated that the tensiometer of the present invention has significantly advanced the state of the art of soil moisture measurement. Instruments in the field can be quickly and conveniently maintained in an air-free condition by simply depressing and releasing a button to open and close the exit passage from the reservoir. By this action, the tube is quickly and conveniently replenished with water and practically all of the entrapped air is removed from the instrument, even if the tube is relatively small in diameter. Any inaccuracies due to breaking the vacuum or to positively sealing the tube are minimized or eliminated by this invention. Furthermore, removal of the air can be effected without applying torque to the instrument and disturbing its contact with the soil, and the whole instrument is easy to assembly and maintain, requiring no tools for assembly or replacement of parts. Other aspects and advantages of the invention will become apparent from the following more detailed description taken in conjunction with the accompanying drawings.

DESCRIPTION OF THE PREFERRED EMBODIMENT

Figure 1:
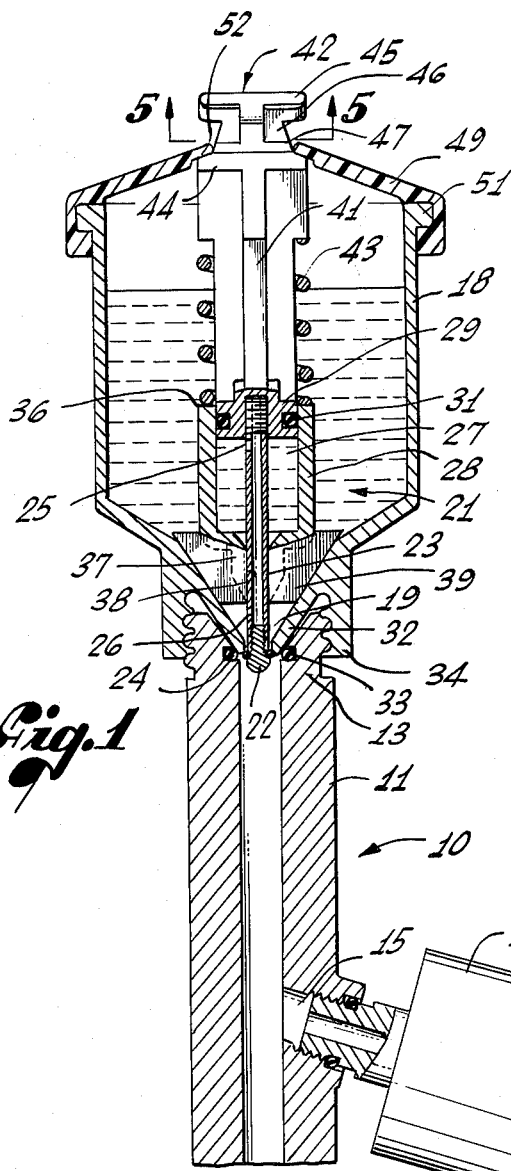
FIG. 1 is a fragmentary, partly sectional view, taken along a longitudinal axis, of a tensiometer embodying features of the present invention, and showing a reservoir and valve assembly with the valve in a closed position.

As shown in the drawings for purposes of illustration, the present invention is embodied in an improved tensiometer instrument, indicated generally by the numeral 10, which can be quickly and conveniently replenished with water and purged of any unwanted air, without breaking the vacuum seal of the instrument for an extended period and without applying positive pressure to the water on resealing the instrument. The tensiometer of the invention comprises an elongated tube 11 with a porous bulb or tip 12 attached to one end, the lower end in FIGS. 1 and 2. The tube 11 is sealed or sealable at its other end, the upper end 13, and, in use, is completely filled with water. A conventional vacuum gauge 14, preferably of the dialed type, is connected to the tube 11 at a side opening 15 near the upper end 13 of the tube. This opening 15 is directed outwardly and downwardly toward the vacuum gauge 14 so that the gauge will be kept in contact with water if the water level should fall below the opening.

As is conventional, the tube 11 is made of some tough, transparent, plastic material, so that the water level can be easily observed when the instrument is in use with its porous tip buried in the soil 16 to be tested. The porous tip 12 may be formed from any of a wide variety of materials, including ceramics, the only requirement being that the "bubbling pressure," the pressure below which air will not pass through wettened pores of the material, must be greater than normal atmospheric pressure, to prevent bubbles of air from entering the tube 11 through the tip.

In accordance with the present invention, a water reservoir 18 with an exit passage 19 is attachable to the upper end 13 of the tube 11, and a valve assembly 21 is operable to open the exit passage 19, to replenish the water in the tube with water from the reservoir, to purge all remaining air bubbles from the tube, and to reseal the exit passage without applying positive pressure to the water in the tube. The valve assembly 21 is operable to purge air from the tube 11 very quickly, so that the vacuum in the tube is broken for only a minimal time, minimizing or eliminating inaccuracies inherent to the action of replenishment.

More specifically, the exit passage 19 in the preferred embodiment is sealed by a valve closure 22 integral with a hollow valve stem 23 having an outside diameter substantially narrower than the exit passage. The valve closure 22 is formed by an enlarged lower end of the valve stem 23, and a sealing ring 24 fitted to the closure is sized to block the exit passage 19 when the valve stem is urged upwardly into a closed position. The valve stem 23 has two side openings 25 and 26 from its hollow interior, an upper opening 25 and a lower opening 26. The upper one 25 opens into a pump chamber 27 defined by the walls of a pump cylinder 28 located in the reservoir 18 and surrounding part of the valve stem. The lower opening 26 is on the reservoir side of the exit passage 19 when the passage is closed, and on the tube side of the exit passage when the passage is open and when the valve stem 23 is moved downwardly from the closed position.

Attached to the valve stem 23 is a plunger 29 sized to fit inside the pump chamber 27 and sealably fitted therein by means of an O-ring 31. As the valve stem 23 is moved downwardly to open the exit passage 19, the plunger 29 forces water down through the hollow valve stem 23 and out from its lower opening 26, which directs the water downwardly and outwardly in a small diameter jet to sweep any air bubbles from the walls of the tube 11. As the valve stem 23 and the plunger 29 move back to the closed position, water is drawn from the tube 11 back into the pump chamber 27, and with this water, any remaining air bubbles are purged from the tube. In the next operation of the valve assembly 21, this air is pumped out through the lower opening 26, and bubbles up through the water in the reservoir 18. By the time the lower opening 26 reaches below the exit passage 19, only water is being pumped through the opening.

The reservoir 18 in the presently preferred embodiment of the invention is generally cylindrical in shape, but has a conical or funnel-shaped bottom 32 the surface of which converges downwardly to merge with a cylindrical hole forming the exit passage 19. The upper end 13 of the tube 11 is also conically shaped to receive the funnel-shaped bottom 32 of the reservoir 18, and includes an O-ring 33 to seal the exit passage 19 to the tube 11. The upper end 13 of the tube 11 is externally threaded to couple with an internally threaded collar 34 integral with the reservoir 18 and surrounding its funnel-shaped bottom 32. Thus, the reservoir 18 and valve assembly 21 may be easily detached from the tube 11 and replaced with a full reservoir and valve assembly, if it is desired to do this rather than refill the reservoir in place on the tube. The pump cylinder 28 has an open top 36 and a bottom 37 with a central hole 38 sized to receive the valve stem 23. The pump cylinder 28 is centrally located in the funnel-shaped bottom 32 of the reservoir 18 and is separated from the funnel-shaped bottom by a plurality of sloping ribs 39 integral with the bottom 37 of the pump cylinder 28. Thus water is free to flow between the ribs 39 to reach the exit passage 19.

The valve stem 23 is threadably attached to the plunger 29. Integral with the plunger 29, is an upwardly extending rod 41 terminating in an actuating button 42 substantially larger in diameter than the rod. A compression spring 43 bears downwardly on the top 36 of the pump cylinder 28 and upwardly on the actuating button 42, thereby urging the rod 41 and valve stem 23 upwardly to keep the exit passage 19 normally closed.

The actuating button 42 includes a lower flange 44 against which the spring 43 bears upwardly, an upper flange 45 by which the valve assembly 21 is manually operated, and a plurality of radially extending ribs 46 joining the upper and lower flanges. Integral with and on the upper face of the lower flange is a slightly tapered boss 47.

Figure 2:
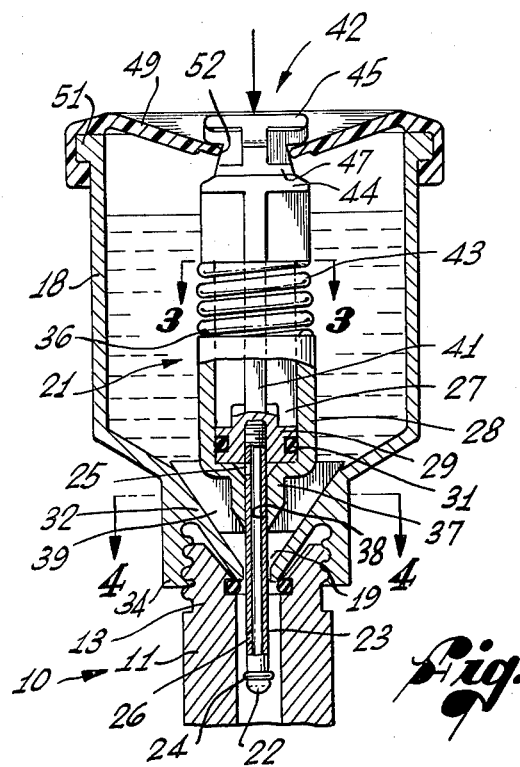
FIG. 2 is a fragmentary view similar to FIG. 1, but principally showing only the reservoir and valve assembly, with the valve shown in an open position.
Figure 5:
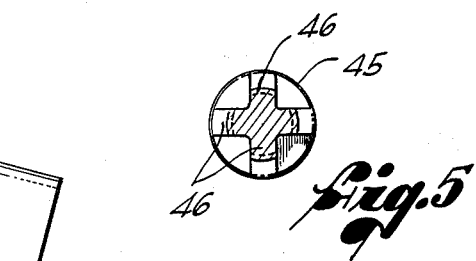
FIG. 5 is a sectional view taken substantially along the line 5—5 in FIG. 1.
Figure 3:
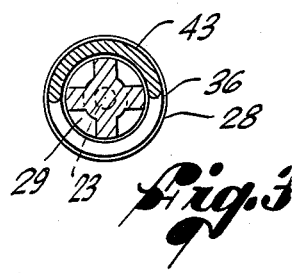
FIG. 3 is a sectional view taken substantially along the line 3—3 in FIG. 2.
Figure 4:
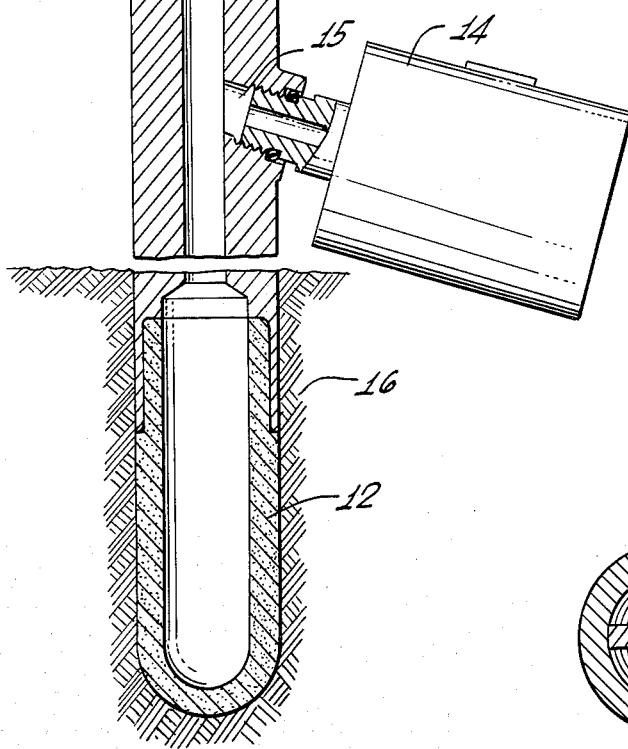
FIG. 4 is a sectional view taken substantially along the line 4—4 in FIG. 2.

A flexible, but relatively stiff reservoir cover 49, made of rubber or some other suitable material, is attached to the reservoir 18 by means of a lip 51 at its top, and has a central hole 57 sized to fit and form a seal with the tapered boss 47 when the valve assembly 21 is in its normally closed position, as shown in FIG. 1. When the actuating button 42 is pushed downwardly, the reservoir 18 is vented to atmosphere as the boss 47 moves clear of the cover 49, thus avoiding any possibility of forcing air into the tube 11. The cover 49 flexes downward slightly, under the upper flange 45, to allow full downward travel of the valve stem 41, as shown in FIG. 2, but this flexing is only incidental to the operation of the valve assembly 21. The cover 49 may be easily peeled from the reservoir lip 51 to allow refilling of the reservoir.

With the exception of the cover 49, the spring 43, and the various sealing elements, the component parts of the reservoir 18 and valve assembly 21 may be manufactured relatively cheaply from plastic materials, using conventional injection molding techniques. Assembly and replacement of parts is conveniently accomplished without the use of tools.

In summary, the tensiometer 10 of the present invention is operable in the following manner to remove air from the tensiometer tube 11. When the actuating button 42 is first depressed, the valve stem 23 and closure 22 are moved downwardly and the exit passage 19 is opened slightly to allow air out and water in. As the actuating button 42 is further depressed, the plunger 29 pumps water from the pump chamber 27, through the hollow valve stem 23, and out from the lower opening 26 in the valve stem, to sweep air bubbles from the walls of the tube 11. Then, as the actuating button 42 is released, water is drawn from the tube 11 back into the pump chamber 27, and any remaining air bubbles are purged from the tube. The exit passage 19 is resealed on the return stroke of valve stem 23 and closure 22, and no positive pressure is applied to the water in the tube 11. Air drawn into the pump chamber 27 on the return stroke is pumped out through the lower opening 26 on subsequent operation of actuating button 42. The lower opening 26 is so located in the stem 23 that all of the air is pumped out before the opening reaches below the exit passage 19.

Although the valve assembly 21 is described and illustrated herein as being operated manually by means of the actuating button 42, it will be readily appreciated that the tensiometer of this invention may be easily adapted for operation by means of a solenoid (not shown). A large number of the tensiometers could then be refilled remotely if the solenoids were connected to a central control station.

It will be apparent from the foregoing description that the present invention contributes significant improvements to the tensiometer art. In particular, the invention is operable to quickly and conveniently replenish the tensiometer 10 with water from the reservoir 18 and to purge unwanted air from the instrument without breaking the tube vacuum for more than a minimal time and without overfilling or applying positive pressure to the water in the tube. Furthermore, no torque, or other net force need be applied to the instrument, and the reservoir and valve assembly of the invention are simple to assemble and maintain, and are easily adaptable to refill even small diameter tubes.

Although a particular embodiment of the invention has been described in detail for purposes of illustration, it will be appreciated that various modifications may be made without departing from the spirit and scope of the invention. Accordingly, the invention is not to be limited except as by the appended claims.

We claim:

1. A tensiometer for measuring soil moisture content, comprising:

a sealable vessel normally filled with liquid and having walls with a porous section to be placed in the soil;

means connectable to the liquid in said vessel for measuring the pressure therein and hence the moisture content of the soil;

liquid reservoir means having an exit to said vessel; and valve means selectively operable for sealing said exit and for opening said exit to allow liquid from said reservoir means to refill said vessel, said valve means including pump means for automatically purging gas bubbles from said vessel, said pump means including means defining a secondary passage from said reservoir means to said vessel when said exit is open, and said pump means being responsive to opening of said valve means, for pumping liquid into said vessel through said secondary passage to thereby sweep gas bubbles from its walls.

2. A tensiometer as set forth in claim 1, further including reservoir cover means for automatically venting said liquid reservoir means in response to operation of said valve means.

3. A tensiometer for measuring soil moisture content, comprising:
   a sealable vessel normally filled with liquid and having walls with a porous section to be placed in the soil;
   means connectable to the liquid in said vessel for measuring the pressure therein and hence the moisture content of the soil;
   liquid reservoir means having an exit to said vessel;
   valve means selectively operable for sealing said exit and for opening said exit to allow liquid from said reservoir means to refill said vessel, said valve means including means for returning said valve means to a closed position sealing said exit; and
   pump means for automatically purging gas bubbles from said vessel, said pump means having means defining a secondary passage from said reservoir means to said vessel when said exit is open, and said pump means being responsive to opening of said valve means, for pumping liquid into said vessel to thereby sweep gas bubbles from its walls, and also being operable in a reverse direction to pump liquid and any remaining gas bubbles from said vessel as said valve means is returned to said closed position.

4. A tensiometer for measuring soil moisture content, comprising:
   a sealable tensiometer tube normally filled with water and having a porous tip to be inserted in the soil;
   a vacuum gauge connected to the water in said tube to measure the pressure therein and hence the moisture content of the soil surrounding said porous tip;
   water reservoir means attachable to said tube and having an exit to said tube; and
   valve means, including
      a valve closure for sealing said exit in a closed position on movement of said closure outwardly with respect to said tube, said closure also being movable inwardly to an open position to allow water in said water reservoir means to refill said tube, and
      means coupled with movement of said valve closure, for pumping water into said tube as said valve closure is moved to the open position and pumping water from said tube as said valve closure is returned to the closed position,
      whereby air bubbles are swept from the tube walls by the water being pumped in as said valve closure is moved to the open position, and are drawn out with the water pumped out as said valve closure is returned to the closed position.

5. A tensiometer as set forth in claim 4, further including reservoir cover means for sealing said water reservoir means and for automatically venting and resealing said water reservoir means in response to operation of said valve means.

6. A tensiometer as set forth in claim 4, wherein said means for pumping water into and from said tube include:
   an auxiliary passage connecting said water reservoir means and said tube;
   means for opening said auxiliary passage simultaneously with opening said valve closure and for closing said auxiliary passage simultaneously with closing said valve closure; and
   pump means responsive to the movement of said valve closure for pumping water through said auxiliary passage.

7. A tensiometer as set forth in claim 6, wherein:
   said valve means include a hollow valve stem attached to said valve closure and extending through said exit; and
   said hollow valve stem forms part of said auxiliary passage and has a first opening to said pump means and a second opening adjacent said valve closure, whereby water is pumped through said hollow valve stem on movement of said valve closure.

8. A tensiometer as set forth in claim 4, further including:
   actuating means connected with said valve closure; and
   resilient means urging said valve closure toward said closed position.

9. A tensiometer for measuring soil moisture content, comprising:
   a sealable tensiometer tube normally filled with water and having upper and lower ends and a porous bulb at its lower end to be inserted in the soil;
   a vacuum gauge connected to the water in said tube to measure the pressure therein and hence the moisture content of the soil surrounding said porous bulb;
   a water reservoir attached to said upper end of said tube and having an exit passage to said tube;
   a valve assembly for controlling flow through said exit passage, including
      a valve closure for sealing said exit passage on upward movement of said closure into said exit passage,
      a hollow valve stem extending through said exit passage and having a lower end attached to said valve closure, a lower opening near said valve closure, and an upper opening substantially above said lower opening,
      a pump chamber within said water reservoir and surrounding a portion of said valve stem and said upper opening,
      a plunger connected with said valve stem above said upper opening and fitted in said pump chamber to pump water through said valve stem between said pump chamber and said tube on movement of said valve closure between a closed position and an open position,
      resilient means urging said valve closure into said closed position, and
      actuating means connected with said valve stem for opening and closing said valve closure,
      whereby, on slight movement from said closed position, water from said reservoir enters said tube and entrapped air escapes through said exit passage, and, on further movement toward said open position, water is pumped from said pump chamber through said hollow valve stem to energe through said lower opening and sweep air bubbles from the walls of said tube, and, as said valve closure returns to said closed position, water and air bubbles are pumped back into said pump chamber as said valve closure reseals said exit passage without application of positive pressure on the water in said tube.

10. A tensiometer as set forth in claim 9, further including:
    a cover over said water reservoir and said valve assembly, said cover having an opening engageable with said actuating means, to vent and reseal said water reservoir automatically in response to operation of said actuating means.

* * * * *